Oct. 6, 1942. W. H. VAN BENSCHOTEN 2,297,846
METHOD OF AND APPARATUS FOR PRODUCING STEREOGRAMS
Filed Oct. 4, 1940 7 Sheets—Sheet 1

Inventor
William H. van Benschoten.
By
Attorney

Oct. 6, 1942.    W. H. VAN BENSCHOTEN    2,297,846
METHOD OF AND APPARATUS FOR PRODUCING STEREOGRAMS
Filed Oct. 4, 1940    7 Sheets-Sheet 3

Inventor
William H. van Benschoten
By
Attorney

Oct. 6, 1942.   W. H. VAN BENSCHOTEN   2,297,846
METHOD OF AND APPARATUS FOR PRODUCING STEREOGRAMS
Filed Oct. 4, 1940   7 Sheets-Sheet 4

Oct. 6, 1942.  W. H. VAN BENSCHOTEN  2,297,846
METHOD OF AND APPARATUS FOR PRODUCING STEREOGRAMS
Filed Oct. 4, 1940  7 Sheets-Sheet 5

Inventor
William H. van Benschoten.
By
Attorney

Oct. 6, 1942.   W. H. VAN BENSCHOTEN   2,297,846
METHOD OF AND APPARATUS FOR PRODUCING STEREOGRAMS
Filed Oct. 4, 1940   7 Sheets-Sheet 6

Inventor
William H. van Benschoten.
By
Attorney

Oct. 6, 1942.                W. H. VAN BENSCHOTEN                2,297,846
               METHOD OF AND APPARATUS FOR PRODUCING STEREOGRAMS
                        Filed Oct. 4, 1940         7 Sheets-Sheet 7
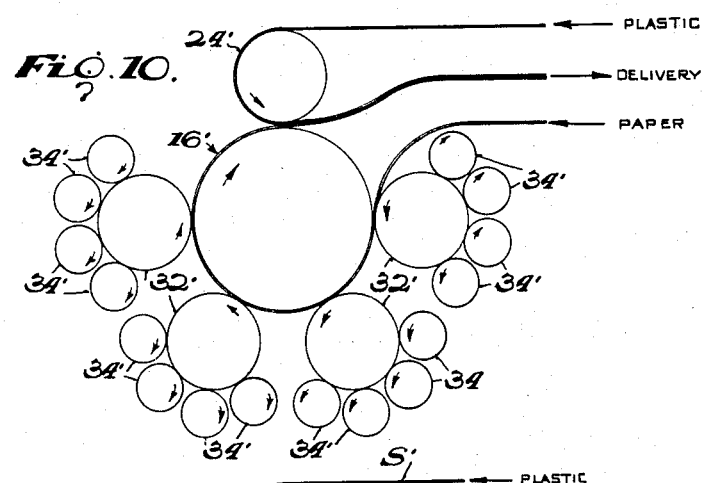
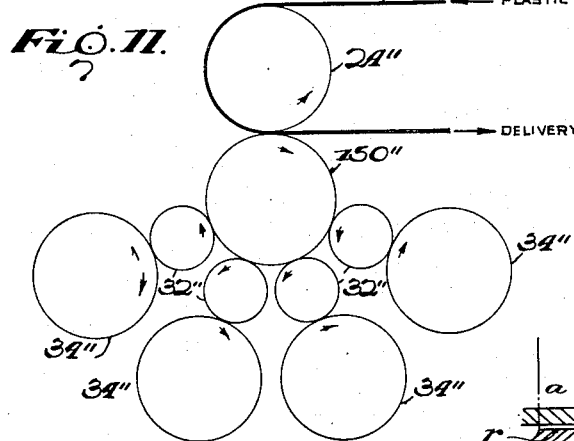
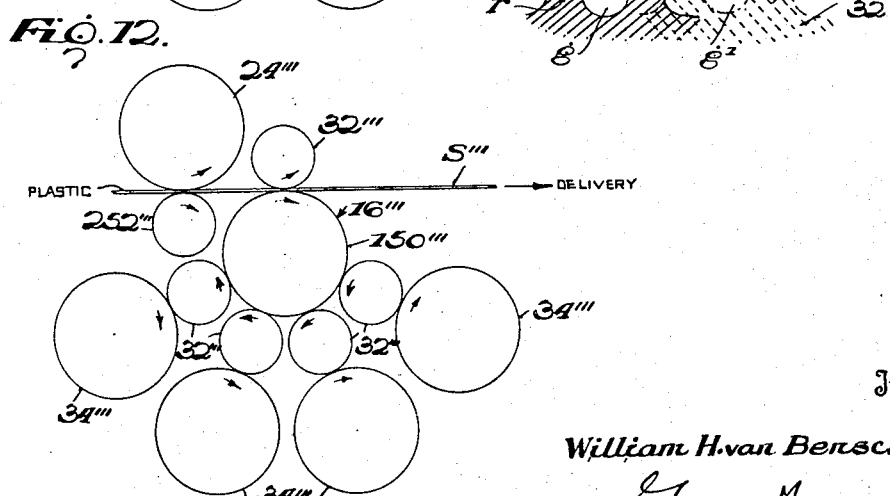
Inventor
William H. van Benschoten.
By
Attorney Patented Oct. 6, 1942

2,297,846

UNITED STATES PATENT OFFICE 2,297,846

METHOD OF AND APPARATUS FOR PRODUCING STEREOGRAMS

William Henry van Benschoten, Washington, D. C.

Application October 4, 1940, Serial No. 359,798

18 Claims. (Cl. 88—29)

The present invention relates to a method of and an apparatus for reproducing composite photographic pictures or other composite representations of objects and for treating the reproduced pictures in such a manner that they may advantageously be viewed in stereographic relief or in changeable relation. The invention is designed as an improvement over the method and apparatus shown and described in my copending application for United States Letters Patent, Serial No. 107,900, filed October 27, 1936, for a Method of manufacture of stereograms.

More specifically, the invention is concerned with the production of pictures which employ or exhibit images of a type which I prefer to term "lineographic," the pictures themselves being arbitrarily termed "lineograms," and these being coined words of which the former is an adjective relating to the image produced while the latter is a noun pertaining to the image forming means as a whole. Lineograms of the type produced according to the present invention are intended to include stereoscopic pictures known as parallax panoramagrams or "depthographs," the latter being a trade-mark name, and also changeable pictures with or without stereoscopic effect wherein means is provided for varying the parts of the picture which shall be visible under given conditions to selectively produce different lineographic color effects as for example Berthon process color effects, or to produce changeable lineographic images.

The invention however is primarily adapted for use in connection with stereograms which are generally of the type shown in the patent to Jacobson, 624,043, dated May 2, 1899, or in my above mentioned application, and which are described in the said Jacobson patent as being reproductions of objects, scenes or the like taken from two different points of view and being made up from the right and left negatives produced by a stereoscopic camera, the images being matched, but each being divided into a series of parallel bands of equal width and the bands of the two views being alternately disposed and so positioned behind a transparent "corrugated" lens plate that a relief effect is obtained in accordance with optical phenomena and sensory perception well understood in the art. Accordingly, the invention has been specifically described in connection with the production of stereograms of the type set forth above but it is to be understood that the same is capable, with or without modification, of being utilized in connection with the production of any or all of the other types of lineograms above enumerated to produce lineographic image effects of varying character.

Heretofore in the production of stereograms of the type disclosed in the Jacobson patent, insofar as available information is concerned, one of two general methods is employed, both of which entail a laborious and expensive hand process. Both of these methods are essentially photographic methods. One method consists in photographically producing a composite picture of the type set forth above and subsequently fitting a preformed transparent lenticulated screen accurately over the picture in such a manner that each single lens unit overlies a pair of adjacent bands and is accurately centered thereon. As a consequence, on viewing the picture through the lenticulated screen, the left and right eyes of the observer, in looking through the individual lens portions respectively fall upon those band-like sections of the composite picture which the brain unconsciously recognizes as belonging together. Due to the phenomena of magnification possessed by each lens unit which for each eye magnifies its respective image increments, viewed through the lens, to full lens width, respective right and left continuous images are seen by the eyes of the observer and the two continuous images are fused into a single sensory image. Since the parallax of vision emanating from the two eyes of the observer cross each other in varying degrees, and since an object appears to be located where the optical axes cross each other, the result is obtained that the observer receives the illusion of depth and hence a three-dimensional impression of the composite picture under observation.

The other method of producing stereograms of this type is to coat a transparent lenticulated screen of the type shown in the Jacobson patent on the plane or back side thereof with a light-sensitive emulsion and to thereafter reproduce the composite picture photographically by exposing and developing the emulsion according to well known photographic processes.

The two methods outlined above are attended by numerous operating difficulties and inefficiencies. In the first place skilled labor is required to carry out the photographic processes involved inasmuch as both processes are essentially photographic. Additionally, neither of the above outlined methods of producing stereograms is adaptable to continuous or mass production of the stereograms and each involves individual treatment and attention for each stereogram produced. In connection with the former method, failure to obtain proper and satisfactory adhesion and/or accurate register between the film paper containing the composite picture and the lenticulated lens screen occasions blurring of all or portions of the images, the production of pseudoscopic effects, moiré or clouding effects, and consequent failure to secure proper stereoscopic relief of the desired image. In connection with the latter method, mass production of stereograms representative of a single stereographic subject is practically impossible inasmuch as the time factor involved in exposing the light-sensitive film and in developing the same, drying the developed film, etc. are prohibitive. In addition to this, unless a semi-transparent stereogram is desired, it is ordinarily necessary to apply to the developed film on the rear side of the lenticulated screen an opaque backing sheet of some sort to lend sharpness of detail to the desired image. The net effect of these disadvantages and operating inefficiencies is to render the processes entirely unsatisfactory for mass production due to the length of time that must be consumed in producing each stereogram and due to the relatively high cost thereof.

The above noted limitations that are attendant upon present day procedure in manufacturing stereograms treat with but a few of the existing problems that must be contended with if consistently good results are to be obtained. According to such present day methods then, each individual stereogram becomes the subject of individual care and attention and the results obtained vary widely according to the skill of the operators involved and according to the particular process or variation thereof which is employed.

The present invention is designed to overcome many of the existing difficulties that are encountered in producing consistently satisfactory stereograms as well as affording a commercially feasible and practical method and apparatus whereby stereograms representing a single picture subject may be repeatedly produced by a continuous automatic process at a comparatively high speed or rate of production of the stereograms and with a degree of perfection hitherto unattainable even under optimum working conditions where individual hand processes are concerned.

This being the principal object of the invention, specifically another and equally important object is to provide a compact and unitary apparatus which utilizes a printing operation, and more specifically an offset printing operation, for the continuous repeated production of a composite stereographic view and which has associated therewith means for creating and fixedly applying to each individual printed stereograph a lenticulated resolving film by means of which the view may be resolved into a plurality of right and left stereographic image portions, visible independently by the right and left eye respectively of an observer to produce the illusion of depth or stereographic relief.

Briefly, in carrying out the above mentioned primary object, the invention in its simplest form thereof contemplates the provision of an apparatus including a pair of cooperating pressing or squeeze rolls or cylinders between which printed composite stereographic picture sheets produced from a previous operation in the process are fed together with sheets of suitable lens-forming material as for example a transparent heat non-convertible thermoplastic resin or a suitable transparent cellulose ester capable of being softened by the action of heat and, if desired, by a suitable solvent. The sheets of lens-forming material and the picture sheets are fed in timed relation to each other to the press rolls in such a manner that they enter between the rolls in superimposed relation with the lens sheet and printed picture arranged contiguously and coextensively.

One of the press rolls is grooved or ridged circumferentially and is provided with heating means whereby an impression is made upon the lens-forming sheets which become heated and consequently softened by direct conduction of heat from the heated roll. The other press roll, insofar as the lenticulating operation is concerned constitutes in effect a lenticulating platen cylinder or impression roll against which pressure is brought to bear during the lenticulating operation.

The latter roll, in addition to serving as a lenticulating platen cylinder also serves as an impression or printing platen cylinder and, as such, cooperates with a plurality of offset blanket-carrying transfer rolls or cylinders which in turn cooperate with respective plate-carrying rolls or cylinders for transferring impressions received by the offset blankets to the picture sheets which are initially fed between the blanket-carrying rolls and the printing platen cylinder.

The invention in its simplest form is designed for use in producing stereograms which are comprised of a single right and a single left stereographic view and in such an instance the impression cylinder cooperates with a pair of offset blanket cylinders which in turn cooperate with respective plate cylinders. Each plate cylinder carries a printing plate representing one of the two views of the composite picture and may be produced by any suitable intaglio, photolithographic, gravure or other process. The corresponding blanket which is formed of rubber in accordance with conventional offset printing methods, is grooved circumferentially to provide a series of parallel elevated ink-receiving ribs with intervening troughs. The two grooves or ribbed transfer rolls are so disposed and accurately registered in axial relation to each other and to the impression cylinder that each roll will impress upon the picture sheets a series of extremely narrow slightly spaced vertical impression bands, the bands impressed by one offset transfer roll filling in the spaces existing between the bands impressed by the other offset transfer roll, thus producing the composite stereographic print.

The picture sheets upon which the completed composite print have been made are advanced by the pressing action of the various rolls and are guided on the surface of the impression cylinder between the lenticulating cylinder and the impression cylinder where they are combined with the plastic lens-forming sheet in the manner previously indicated.

When utilized in the formation of stereograms which are comprised of more than two stereographic views, for example, where the original scene or view has been photographed from additional points lying to the right or to the left of the points where the medial right and left stereoscopic views have been taken, additional ribbed offset transfer cylinders and cooperating plate cylinders are employed. The printing plates carried by the additional plate cylinders represent the additional views and the transfer cylinders are so disposed an accurately registered in axial relation to each other that each successive series of spaced parallel bands applied to the picture sheet will fill in a portion of the spaces existing between previously placed bands until, at the time of contact of the last transfer roll with the picture sheet, a substantially continuous multiple-view picture print results.

The invention in a modified form thereof contemplates the incorporation in the apparatus of plural plate-carrying cylinders for each offset transfer cylinder, each plate cylinder of one series being adapted to utilize a different color whereby a colored stereographic image in the completed stereogram may be viewed.

In another modified form of the invention, provision is made whereby a pair of separation offset transfer rolls which cooperate with the plate cylinders apply their respective portions of the composite picture directly to a cooperating transfer cylinder, which in turn transfers the composite picture directly to the rear side of the lens forming material, this feature being accomplished with an apparatus similar to that previously outlined with the exception that no provision is made for feeding picture sheets to the apparatus.

In still another modified form of the invention, the printing operations and the operations whereby the plastic lens-forming sheets are applied to and formed on the picture sheets are maintained independent of one another. In a somewhat similar arrangement, the printing and lenticulating operations are maintained independent but the printing operation is performed directly on the lens-forming sheet and the feeding of picture sheets is dispensed with.

In yet another form of the invention, provision is made whereby the composite picture designs are applied by a printing operation directly onto the plane rear side of the transparent film sheets undergoing lenticulation and subsequently backing sheets are automatically applied to the printed lens sheet.

Irrespective, however, of these various modifications of the invention, the essential features thereof are at all times preserved.

Numerous operating advantages and efficiencies accrue from the use of apparatus of the type briefly outlined above and among these is the elimination of the necessity for extremely accurate register of the printing plates employed upon the plate-carrying cylinders. The offset transfer cylinders after once being adjusted relative to each other and to the lenticulating roll in the proper manner will continue to print their respective picture strips as a completely registered composite stereographic picture and in register with the lineated lenticular film which is subsequently applied to and formed upon the picture sheet. Thus different plates representing different picture subjects may be substituted in the apparatus without requiring extreme accuracy in the mounting and adjustment thereof or without requiring further adjustment of the apparatus, while at the same time accurate registry of the printed views produced on the picture sheet will automatically be obtained.

Another advantage of the present invention resides in the fact that by the above-described apparatus the picture sheets are printed while carried by the impression cylinder while likewise the lens-forming sheet is applied and the lens ridges formed thereon while the picture sheets are on the impression cylinder. Thus in effect the picture sheets are carried from one operation to the next on a revolving cylinder without necessitating shifting of the sheets.

A very distinct advantage of the invention accrues from the fact that by the particular offset printing process employed a lenticulated film of less thickness than has heretofore been possible may be employed upon the picture sheets. By utilizing a thinner film sheet the per print cost of the sterograms or other lineograms may be materially reduced. For reasons that need not be outlined herein an inverse proportion obtains between the number of picture bands or strips in the composite picture and the thickness of the required lenticulated film sheet. Because of the fact that the improved offset printing process employed in connection with the present invention will permit of a comparatively large number of picture strips in the composite picture, an extremely thin lenticulated lens sheet may be employed thus greatly reducing the cost of the stereograms. Specifically, experimentation has shown that utilizing one hundred picture strips to the inch in the composite picture, the required thickness of the lens sheet is approximately .07 inch. The particular offset printing herein employed will permit of as many as six hundred picture strips to the inch and thus by mathematical reasoning a lenticulated film sheet of slightly greater than .01 inch may be employed in producing the stereograms.

The improved printing process employed in connection with the present invention will also permit the use of relatively coarse printing plates on the plate cylinders.

These last two factors just enumerated for the first time bring the manufacture of stereograms or other lineograms into the realm of magazine and even newspaper printing inasmuch as with extremely thin lens films and coarse printing plates neither the aggregate thickness of the completed stereograms nor the character of the paper on which the composite pictures are printed will present commercial objections.

The realization of these advantages being in the nature of objects that are fulfilled in the production and development of the invention, it is a still further object of the invention to provide an apparatus of this character wherein means is provided for collectively adjusting the width of the ridges existing on the various offset transfer blanket cylinders as well as the spaces existing between the ridges in order that compensation may be made for discrepancies in the width of the individual lens strips of the lenticulated film arising from elongation of the metal lenticulating cylinder which is internally heated. For convenience, the offset blankets and the lenticulating cylinder are grooved from the same line pattern and thus, when the cylinder becomes heated, a discrepancy exists in the register of the grooves existing in the cylinder and in the rubber offset blanket. In practice this condition of non-registry is remedied by the simple expedient of providing means for stretching the offset blankets to collectively widen the grooves existing between the individual adjacent ridges.

The provision of an apparatus which is extremely compact in its design and which occupies but little floor space; one which may be manufactured at a relatively low cost, one which is rugged and durable and which is therefore unlikely to get out of order; one which may be operated at a relatively high speed and which is therefore well adapted for use in the commercial production of stereograms or other lineograms; one which may be readily assembled and disassembled for the purpose of inspection and repair; one wherein the various operative parts thereof are readily accessible for the purpose of plate substitution or inspection; one which requires little attention on the part of an operator yet which will produce stereograms that are of a consistently high quality automatically; and one which otherwise is well adapted to perform the services required of it, are further desiderata that have been borne in mind in the production and development of the present invention.

Numerous other objects and advantages of the invention not at this time enumerated will become readily apparent as the nature of the invention is better understood.

In the accompanying seven sheets of drawings forming a part of this specification, several embodiments of the invention are shown. In these drawings:

Figure 10 is a side elevational view entirely diagrammatic in its representation showing a modified form of the apparatus designed for use in the production of colored stereograms or other lineograms by a color printing process.

Figure 11 is a side elevational diagrammatic view similar to Figure 10 showing another form of the invention designed for use in producing lineograms by a printing process wherein a composite picture is printed directly on a lens-forming sheet and the sheet is simultaneously lenticulated.

Figure 12 is a diagrammatic view similar to Figures 10 and 11 showing a still further modified form of apparatus employing separate printing and lenticulating mechanisms, and Figure 13 is a diagrammatic view illustrating the printing method utilized in connection with a two-image stereogram or other lineogram.

In all of the above-described views, like characters of reference are employed to designate like parts throughout.

Figure 1:
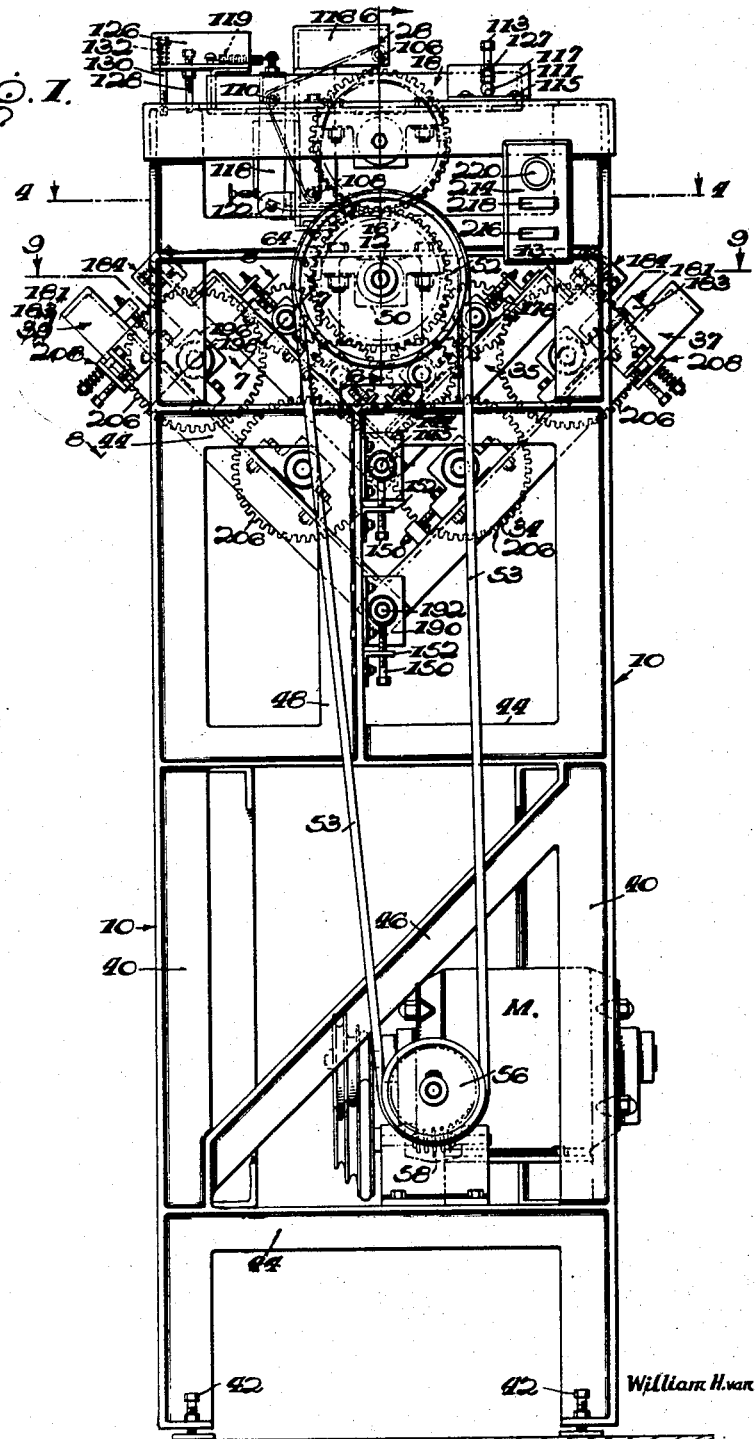
Figure 1 is an end elevational view of one form of an apparatus manufactured in accordance with the principles of the present invention.
Figure 2:
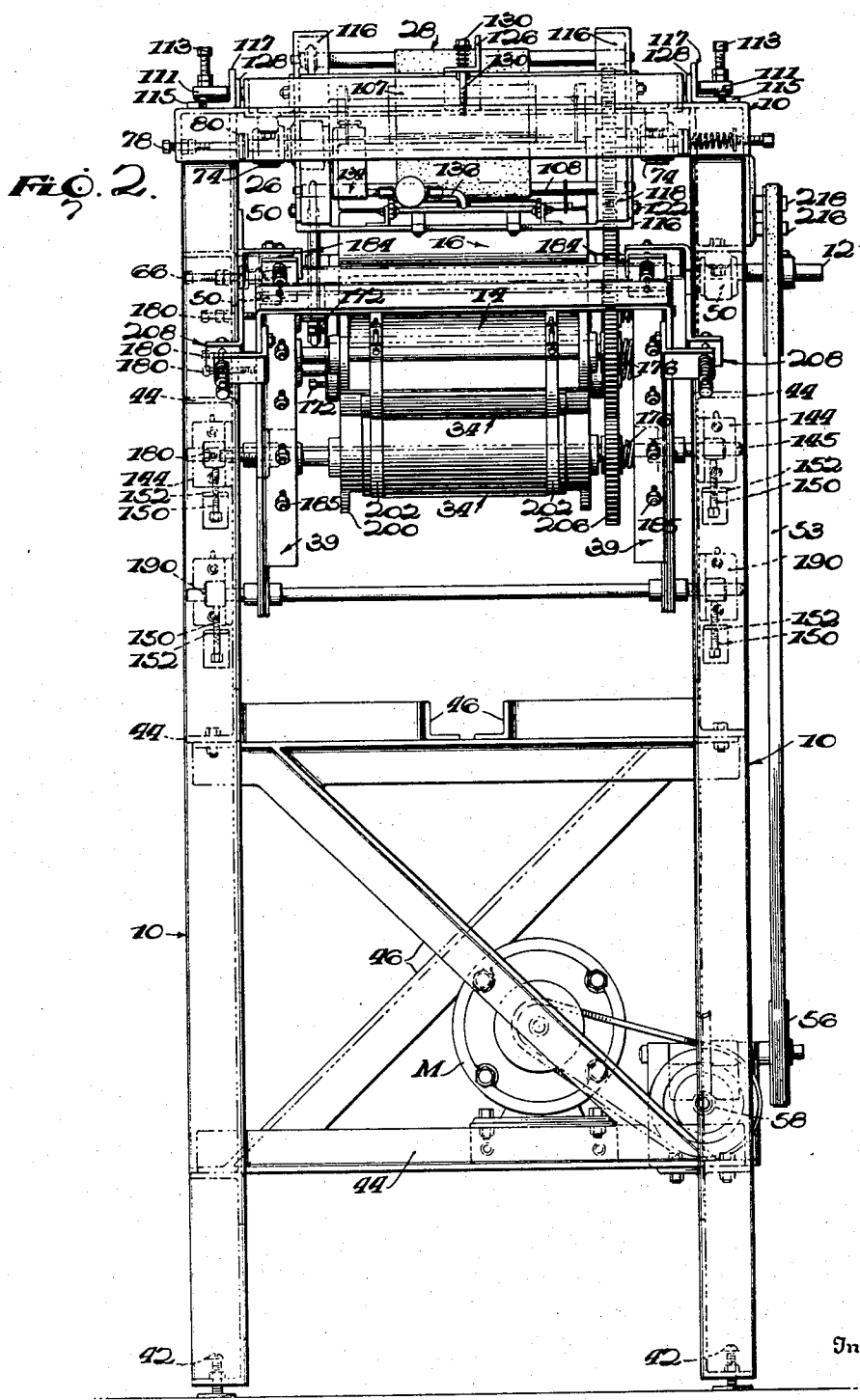
Figure 2 is a front elevational view thereof.
Figure 5:
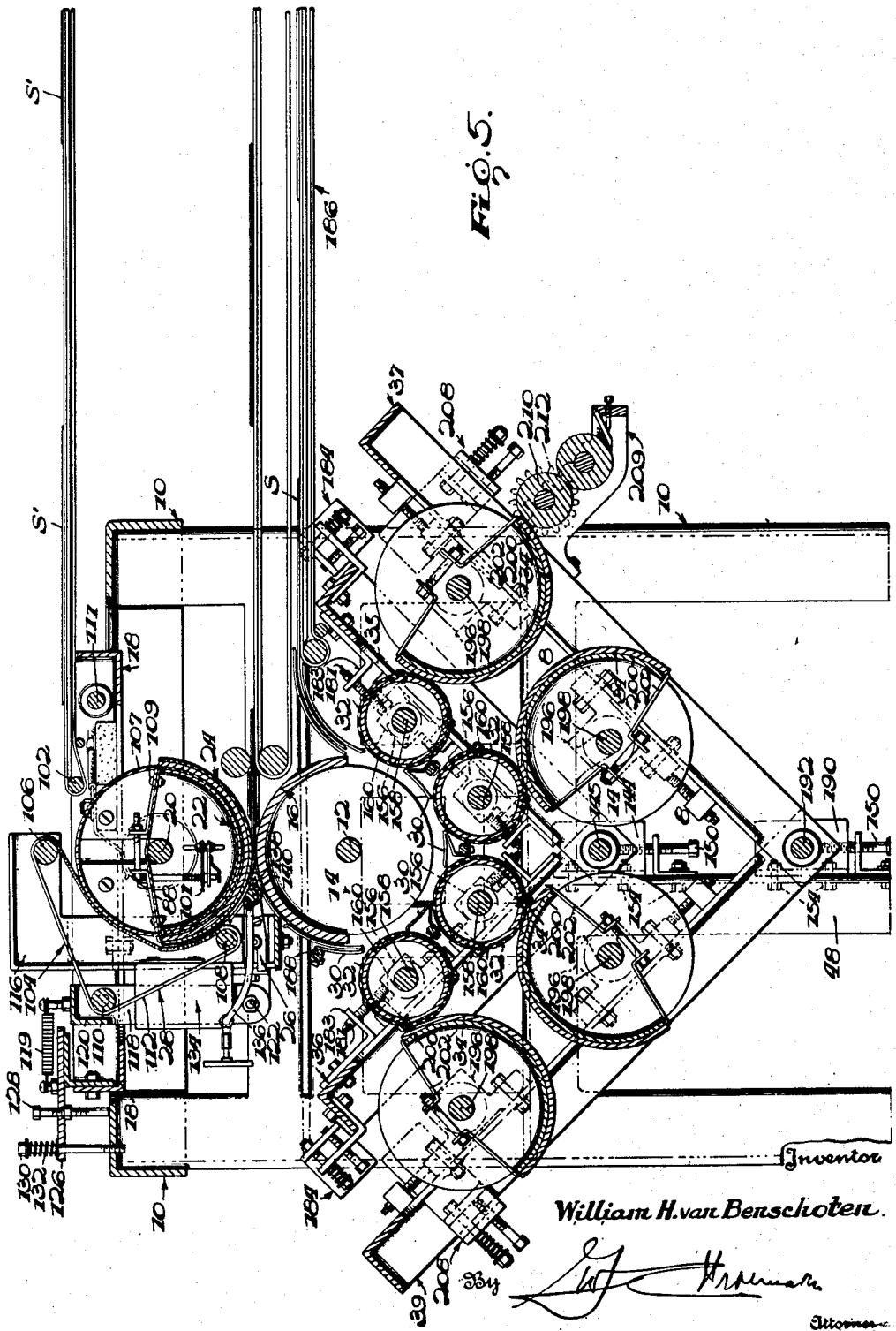
Figure 5 is an enlarged fragmentary sectional view taken transversely through the apparatus in the upper region thereof and illustrating the relationship of the various printing and lenticulating cylinders to one another.

Referring now to the drawings in detail and in particular to Figures 1, 2 and 5, briefly the apparatus includes a framework 10 which carries in its lower regions an electric motor M. The motor is operatively connected in driving relationship to a main driving shaft 12 which is mounted in the framework for revolution about a horizontal axis in the upper regions of the machine. A platen assembly designated generally at 14 and which includes a curved platen plate 16 of substantially semi-cylindrical design is mounted on the shaft 12 and is rotatable therewith.

An auxiliary cradle-like framework 18 is tiltably and adjustably disposed on the main framework 10 in yielding relation at the upper end thereof and carries a horizontal rotatable shaft 20 on which there is disposed a lenticulating assembly 22 including an electrically heated lenticulating plate 24 of semi-cylindrical design and which cooperates with the curved platen plates 16 in the manner of a pair of pinch rolls for receiving therebetween printed sheets S carrying a composite picture obtained by a printing process together with sheets S' of a film-like lens-forming plastic material, which printed sheets S and film sheets S' are fed between the cooperating plates 16 and 24 in superimposed relationship. A solvent applying device designated generally at 26 applies a surface softening agent to the inside surface of the film sheets and means is provided for adjusting the inclination of the cradle-like framework 18 and causing the curved lenticulating plate 24 to yieldingly bear against the heat-softened and moistened plastic film sheets with the proper degree of pressure to effect lenticulation of the film sheets as well as to secure proper adhesion between the surface of the latter and the printed picture sheets.

Movable guiding means in the form of an endless belt assembly 28 carried by and movable bodily with the cradle-like framework 18 serves to guide the film sheets which are received from the front of the machine and pass rearwardly around the lenticulating assembly 22 and forwardly between the plates 16 and 24 where they are united to the printed picture sheets and delivered from the machine forwardly thereof.

A plurality of stationary guiding devices 30 carried by the main framework serves to guide the printed picture sheets upwardly around the platen assembly 14 and between the plates 16 and 24 where they are initimately united to the film sheets as previously described.

As will more clearly appear during a subsequent specific description of the machine, the printed composite picture sheets S have printed thereon a plural series of picture increments which are arranged in spaced parallel relationship, with the increments of each series being arranged alternately, or alternately in sequential order, and each increment of a series representing a corresponding narrow area lifted, so to speak, from an area of one of a plurality of individual pictures or stereoscopic views employed in making up the desired composite pictures.

The printing operation employed in producing such a composite picture is an offset process wherein a series of rotatable grooved cylindrical offset printing blankets 32 formed of rubber or other resilient material receive an ink impression from a plurality of respective curved printing plates 34 which may be produced by a photo-lithographic, photo-engraving or other graphic operation and which have formed thereon the respective impressions of the various individual stereographic or other views of the composite picture.

The printing blankets 32 are rotatably carried in individually adjustable and tiltable frame members 35 and 36 carried by the main framework 10 and the printing plates 34 are similarly carried in individually adjustable and tiltable frame members 37 and 39, which are likewise carried by the framework 10. Suitable gearing, which will be described hereinafter, serves to connect the various printing plates, offset blankets, the platen assembly and the lenticulating assembly in operative timed driving relationship.

As will also be fully described hereinafter, means is provided for adjusting the various printing and lenticulating assemblies in such a manner that accurate offset register of the various picture strip increments in the composite picture will result. By "offset register" is implied the accurate laying down of the various picture increments which are transferred from the printing plates 34 by the offset blankets to the picture sheets in such a manner that proper sequential arrangement of the picture increments is obtained while at the same time the entire surface of the picture sheets are printed upon without the presence of voids or overlapping between adjacent picture increments. The manner in which such offset register is obtained on the picture sheets is diagrammatically illustrated in Figure 13 to which specific reference will be made subsequently. The adjusting means just referred to also includes provision for obtaining proper relative register between the lenticulating plate 24 and the various offset blankets 32 in order that, in the completed stereographic or changeable picture product, register of the individual lens strips with their respective pairs or groups of sequentially arranged picture increments will be obtained.

Referring now to Figures 1 and 2 in detail, the framework 10 involves in its general organization front and rear vertical corner posts 40, the lower ends of which are provided with conventional leveling devices 42. The corner posts 40 are connected together at various levels by horizontal bars 44, while diagonal strut members 46 and vertical reinforcing bars 48 are included in the general organization of the framework to reinforce the same and provide an extremely rigid structure. As will appear presently, it is essential that the framework be of a rugged character in order to maintain the various precision parts of the printing and lenticulating devices accurately positioned and in relative register with one another.

Figure 6:
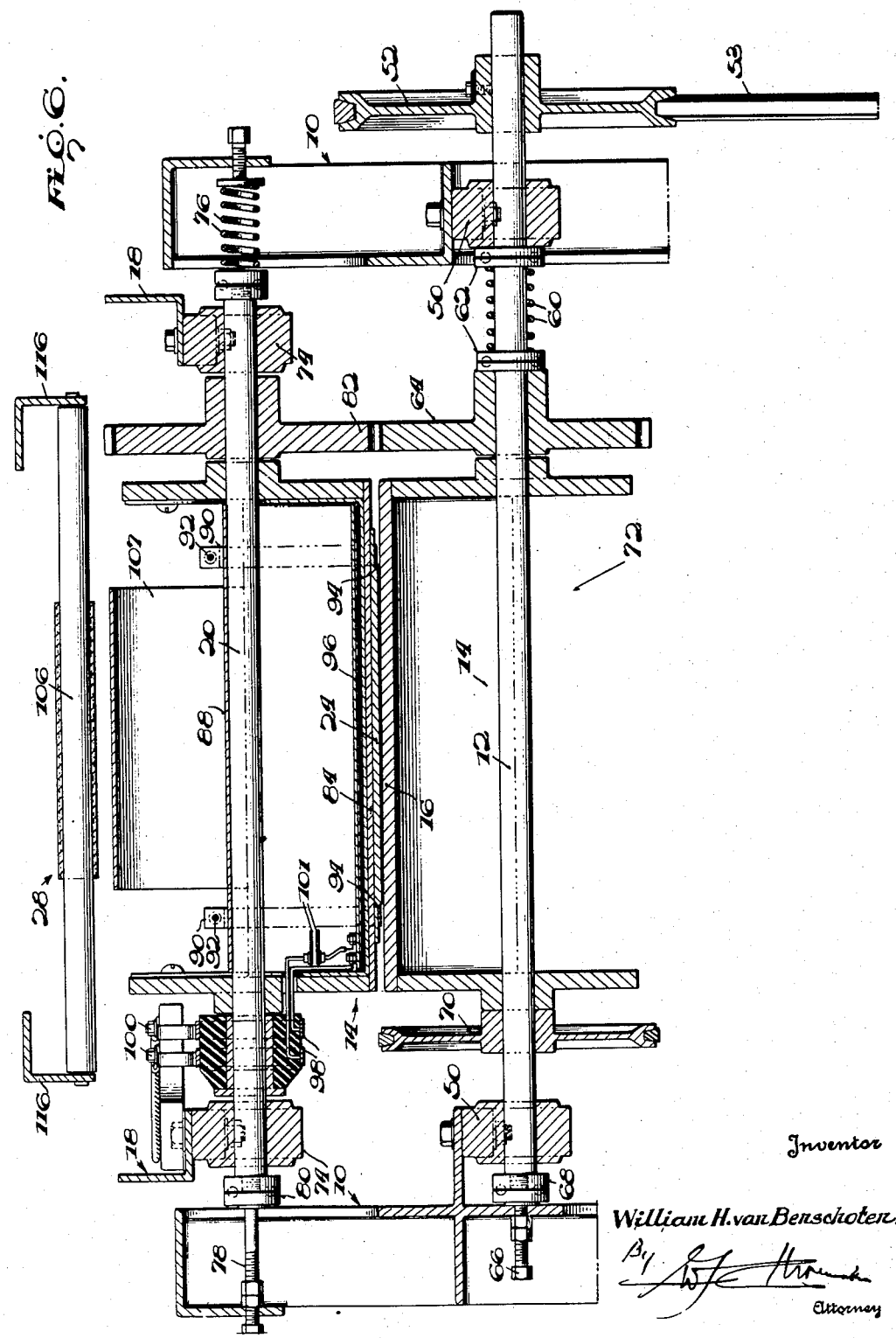
Figure 6 is an enlarged sectional view taken substantially along the line 6—6 of Figure 5.

Still referring to Figures 1 and 2 and in addition to Figures 5 and 6, the shaft 12 is rotatably supported in bearings 50 which are rigidly supported from the framework 10. The shaft 12 carries a pulley 52 exteriorly of the framework 10 and a driving belt 53 passes over the pulley 52 and over a similar pulley 56 which is operatively connected in driving relationship to the motor M through a suitable gear reduction device 58. The motor M and gear reduction device are preferably mounted on the framework 10 in the lower regions of the machine.

The shaft 12 is capable of limited axial adjustment relative to the bearings 50 and toward this end a coil spring 60 (Figure 6) disposed between a pair of thrust bearings 62, which in turn are disposed between one of the bearings 50 and a fixed gear 64 serves to normally urge the shaft to the left as seen in this figure. An adjusting screw 66 extends through the framework 10 and slidably bears against a thrust bearing 68 and serves to maintain the shaft 12 in any desired adjusted position.

The gear 64 serves to drive or transmit motion to the lenticulating plate 24 as will appear presently and also assists in combination with a fixed pulley 70 in centering the platen assembly 14 on the shaft 12. The pulley 70 serves to transmit motion to the lens-sheet guiding device 28 as will also appear subsequently.

Still referring to Figure 6, the platen assembly 14 is in the form of a drum-like member of fragmentary or semi-cylindrical design including an open side 72 and a curved semi-cylindrical wall which constitutes the platen plate 16 previously mentioned.

The shaft 20 is rotatably mounted in bearings 74 which are fixed to and suspended from the cradle or auxiliary frame 18. A coil spring 76 and adjusting screw 78 similar to the spring 60 and adjusting screw 66 permit limited axial adjustment of the shaft 20 through the bearings 74 in which the shaft is slidably and rotatably mounted. The adjusting screw 78 is threadedly received in the framework 10 and in order to accommodate tilting adjustment of the cradle 18 relative to the framework 10, the adjusting screw 78 has sliding engagement with a thrust bearing 80 disposed on the end of the shaft 20.

A gear 82 carried by the shaft 20 meshes with the driving gear 64 on the shaft 12 and thus the two shafts are operatively connected together for rotation in opposite directions. The gears 64 and 82 are provided with an equal number of teeth in order to secure proper synchronism of movement between the lenticulating plate 24 and the platen plate 16.

The lenticulating plate 24 is removably fastened or strapped to a drum-like semi-cylindrical member 84 across the open sides of which there extends interiorly a cover plate or heat retaining wall 88. A pair of straps 90, including fastening screws 92 extending around the semi-cylindrical drum or member 84, are seated in recesses 94 formed at the ends of the lenticulating plate 24 and serve to hold the plate and heat retaining wall 88 in position. An electrical heating unit 96 is disposed within the member 84 in close proximity to the wall thereof and is maintained in position by the wall 88 and serves to radiate heat outwardly through the wall and grooved lenticulating plate 24 to soften the lens sheets S' and render them susceptible to the lenticulating operation. Current is supplied to the heating unit 96 by means of a slip-ring construction 98 having terminals 100 which are electrically connected to a suitable source of current (not shown). A thermostat 101 serves to regulate the amount of current supplied to the heating unit 96.

Referring now to Figures 5 and 6, the lens sheets S' are fed into the machine over the lenticulating assembly 22 in timed relation to the speed of rotation of the lenticulating plate 24 and platen plate 16 by means of an endless conveyor 102. In order to guide the sheets S' around the surface of the grooved plate 24, this surface in following its normal path of movement cooperates with the guide belt assembly 28. The assembly 28 includes an endless belt 104 mounted on rollers 106, 108 and 110 arranged in parallelism and disposed in triangular fashion to provide two belt straightaway portions 112 and a curved slack portion 114. The rollers 106, 108 are rotatably mounted in fixed relation to each other and extend across the space existing between a pair of L-shaped members 116 constituting a portion of the cradle framework 18. The roller 110 is carried between the upper ends of a pair of side members 118 of a tiltable frame 120 which is pivoted as at 122 adjacent its lower end to the cradle 18 and which is normally urged rearwardly by means of a spring 119 in order that the roller 110 may be held taut against the belt 104 to take up any slack existing therein.

An arched member 107 which may be formed of sheet metal or the like is secured by means of screws 109 or in any other suitable manner in position on the cover plate or wall 88 and in effect forms a continuation of the surface of the curved grooved lenticulating plate 24 in order that the belt 104 will not sag during movement of the curved plate 24 through the regions of the lenticulating drum assembly remote from the belt.

Figure 3:
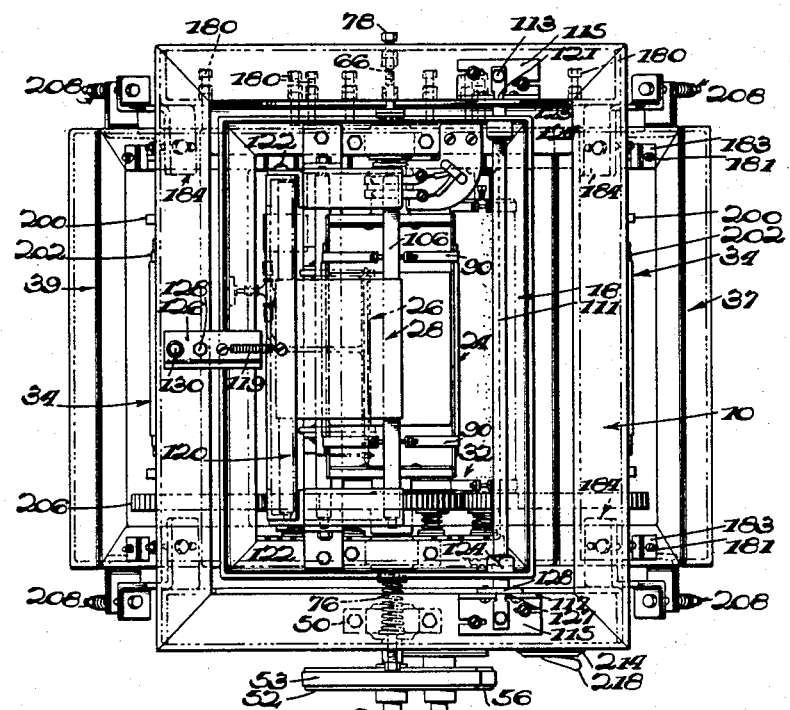
Figure 3 is a top plan view thereof.
Figure 4:
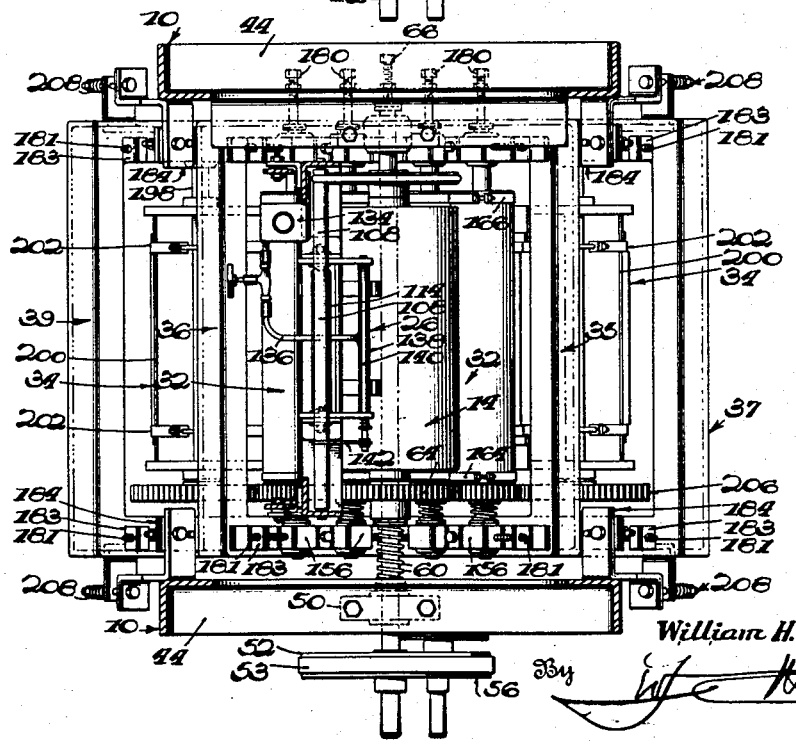
Figure 4 is a sectional view taken substantially along the line 4—4 of Figure 1.

The means whereby the cradle 18 may be tiltably adjusted is best illustrated in Figures 1, 3 and 5. The cradle framework is generally of rectangular configuration and is nested within the confines of the outer framework 10 at the top thereof. A stationary rod 111 extends across the upper portion of the framework 10 and the ends thereof threadedly receive therethrough a pair of adjusting screws 113 by means of which the rod is adjustable as regards its height and inclination. The lower ends of each screw 113 bears against a bracket 115 having an upstanding flange 117 provided with a vertical slot 127 through which the end of the rod 111 extends. The rod 111 is formed with a reduced portion or groove 121 which cooperates with the flange 117 in preventing lateral shifting of the rod relative to the bracket. Locking means in the form of plates 123 through which the ends of the rod 111 extend and which are adjustably secured to the flange 117 by means of bolt and slot connections are provided for maintaining the rods permanently in any desired position of adjustment. The forward end of the cradle 18 is pivoted upon the rod 111 and a pair of collars 124 positioned on the rod bear against the inside of the cradle frame and prevent shifting of the cradle on the rod 111.

A bracket 126 (Figure 5) secured to the framework of the cradle 18 in the medial regions of its rear end overlies a portion of the framework 10 and threadedly receives therethrough a limit stop adjusting screw 128, the lower end of which bears against the upper edge of the framework 10. A stud 130 adjustably threaded in the framework 10 projects upwardly through an aperture in the bracket 126 and carries a coil spring 132 which normally serves to assist the action of gravity in urging the rear end of the cradle downwardly in the framework 10. Obviously by turning the stud 130 in one direction or the other the compression of the spring 132 may be varied to regulate the pressure exerted by the lenticulating plate 24 upon the platen plate 16 during the lenticulating operation.

The solvent applying device 26 is best illustrated in Figure 5 and includes a solvent storage receptacle 134 adapted to contain a supply of acetone or other softening agent for the film sheets S'. The receptacle 134 is connected by means of a conduit 136 to an elongated solvent trough 138 in which there is disposed a rotatable applicator roller 140 which is adapted to bear against the inside surface of the lens forming sheets S' to moisten the same. A belt 142 operatively connects the lowermost belt-supporting roller 108 and the applicator roller 140 in driving relationship. The solvent tank or receptacle 134 is sealed to the atmosphere and thus the solvent is withdrawn from the roller 140 only when it is required and undue volatilization or evaporation of the solvent is avoided.

Referring now to Figures 1, 3, 4 and 5 for an illustration of the printing instrumentalities employed in connection with the present invention, a pair of oppositely disposed bearing blocks 144 are secured to the vertical bars 48 centrally of the framework 10 and serve to support therebetween a shaft 145 upon which there is mounted for tilting movement about the axis of the shaft a pair of offset blanket supporting frame members 35 and 36, each of which is generally of rectangular design. The operating height of the frames 35, 36, and their inclination with respect to the central vertical transverse plane of the apparatus is rendered adjustable by means of adjusting screws 150 which are threadedly received through brackets 152 secured to the bars 48 and which bear at their upper ends against the bearing blocks 144 and by means of which the height and inclination of the shaft 145 may be adjusted. Locking bolts 154 extending through slots in the bar 48 serve to maintain the bearing blocks 144 in any desired adjusted position.

Mounted on each of the frame members 35, 36, at opposite sides thereof are a plurality of pairs of aligned bearing blocks 156 (see also Figure 7), each pair of which serves to rotatably support therebetween an offset blanket supporting shaft 158. A metal cylinder 160 is mounted on each shaft 158 and is spaced therefrom by means of hub members 161 which are anchored to the shaft by means of set screws 162. The flexible cylindrical grooved blankets 32 are mounted on the respective cylinders 160 which they surround and one end of each blanket is anchored or clamped to the cylinder by means of a strap 164. The other end of each blanket 32 is similarly anchored or clamped by a strap 166 to a slidable disk 168 which is keyed as at 170 to its respective shaft 158. Adjusting screws 172 extending through the disk 168 bear against one of the hub members 161 and permit elongation of the blanket to compensate for elongation of the metal lenticulating plate 24 when heated by the heating unit 96 as previously set forth.

Figure 7:
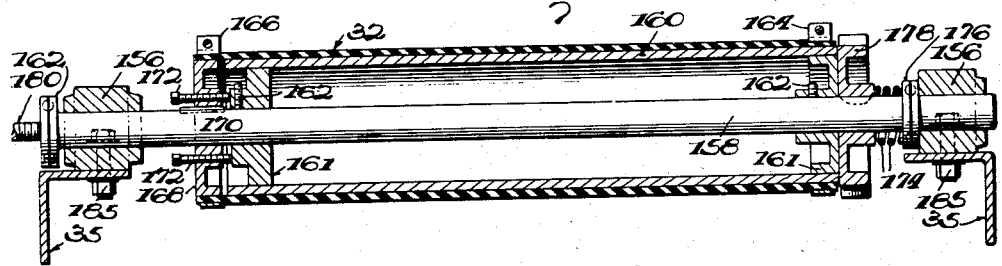
Figure 7 is an enlarged fragmentary longitudinal sectional view taken through one of a plurality of offset transfer rolls employed in connection with the present invention.

In order to effect exact collective registry of the individual grooves formed in the resilient blankets relative to the grooves of the lenticulating plate 24, means is provided for adjusting the various shafts 158 relative to the main framework 10. In this manner any slight lateral shifting of the pivoted frame members 35, 36 will be of no consequence insofar as conditions of collective registry of the offset blankets are concerned. Toward this end a coil spring 174 is disposed around each shaft 158 and bears at one end against an antifriction bearing 176 which in turn bears against one of the bearing blocks 156. The other end of the spring 174 bears against a gear 178 which meshes with the gear 64 (Figures 2 and 6) on the platen plate carrying shaft 12. The shaft 158 is thus normally urged to the left as shown in Figure 7. An adjusting screw 180 threaded through one of the stationary members of the main framework 10 slidably bears against an antifriction thrust bearing 182 and serves to force the shaft 158 against the action of the spring 174 to any desired position of adjustment.

The individual offset blanket cylinders 32 and their positions relative to the printing platen cylinder assembly may be altered by adjusting the positions of the individual bearing blocks 156 carrying the shafts 158. Accordingly, adjusting screws 181 having threads of opposite pitch in the end regions thereof extend through brackets 183 (Figure 5) fixed to the frame members 35, 36 and into the bearing blocks 156, while locking studs 185 serve to clamp the bearing blocks in any desired position of adjustment.

Referring now to Figure 5, it will be seen that the frame members 35, 36 are held in their elevated operative positions with the gears 178 in mesh with the gear 64 and with the resilient printing blankets 32 in operative printing relation to the platen plate 16 by means of an adjusting assembly 184 which is substantially identical with the adjusting assembly 126, 128, 130, 132 previously described in connection with the adjustable cradle 18. Release of the adjusting assembly will permit the frame members 35, 36 to be moved to a horizontal position where inspection of the various blanket assemblies may conveniently be made or whereby access to the printing platen plate assembly 14 or other internal operative parts of the machine may be conveniently obtained. When the frame members are restored to their operative position, the original conditions of register afforded by the adjusting screws 180 carried by the framework 10, obtain.

The blank picture sheets are fed to the machine in timed relation to the introduction of the lens sheets on a conveyor 186 (Figure 5) and are passed in succession between the various successive offset printing blankets 32 and the platen plate 16 and are guided around the platen assembly by means of the guide members 30 which, for convenience, may be mounted on transverse rods 188 carried by the framework 10.

Still referring to Figure 5, a pair of oppositely disposed bearing blocks 190 similar in every respect to the bearing blocks 144 are secured to the vertical bars 48 below these former bearing blocks and serve to support therebetween a shaft 192 having mounted for tilting movement thereon a pair of plate assembly carrying frame members 37, 39 which, except for the fact that they are slightly larger than the frame members 35, 36, are substantially identical therewith. The frame members have adjustably supported thereon bearing blocks 196 corresponding in substantially every detail to the bearing blocks 156 and also carrying axially adjustable printing plate-supporting shafts 198, the mountings for which are substantially the same as the mountings for the shafts 158.

Figure 8:
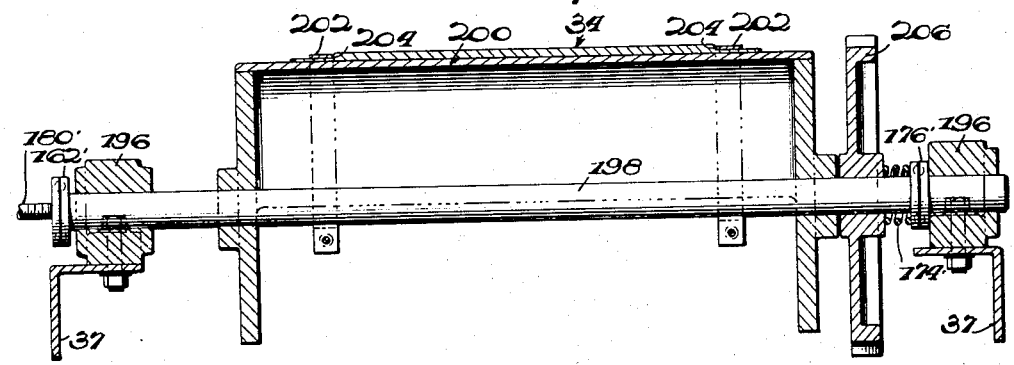
Figure 8 is a sectional view similar to Figure 7 taken through one of a plurality of plate-carrying rolls also employed in connection with the invention.
Figure 9:
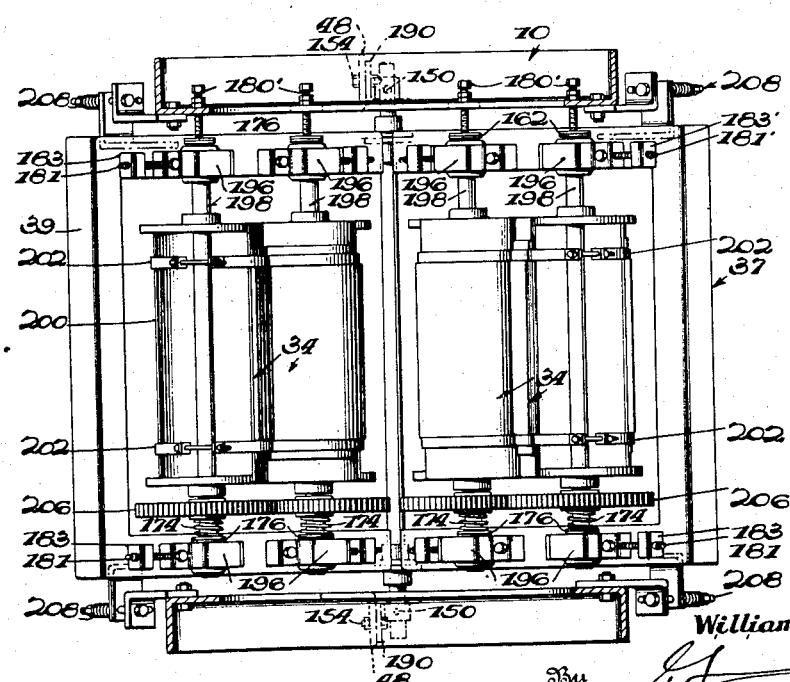
Figure 9 is a sectional view taken substantially along the line 9—9 of Figure 1.

Referring now to Figure 8, each of the shafts 198 has mounted thereon a plate carrying drum-like members 200 of semi-cylindrical design. The members 200 are centered upon the shafts with their respective plates 34 which they carry in reasonably approximate register with one another. The plates 34 are strapped to the members 200 by means of straps 202 which seat in grooves 204 formed at the ends of the plates.

A gear 206 mounted on each of the shafts 198 is designed for meshing engagement with one of the respective gears 178 when the frame members 37, 39 are maintained in their operative elevated inclined positions. The frame members 37, 39 are adapted to be releasably, yieldingly and adjustably maintained in their elevated inclined positions by means of adjusting assemblies 208 which are substantially identical with the assemblies 184. Upon release of the frame members 37, 39, the latter may be swung to horizontal positions for the purpose of inspection, adjustment of parts, substitution of parts and the like.

A conventional inking device (Figure 5) 209 may be provided for each printing plate 34 and may include an ink distribution roll 210 having a gear 212 adapted to mesh with one of the gears 206.

The electrical circuits involved in connection with the apparatus just described have not been fully illustrated inasmuch as no novelty is involved therein. A conventional type of switch unit 214 (Figure 1) may be mounted at any convenient point on the framework 10 and may include a control switch 216 for the motor M and an independent control switch 218 for supplying current to the heating element 96 through the slip ring construction 98. If desired, a pilot lamp 220 may be placed in series with the heating element 96 to indicate its energization.

It is believed that from the above description the nature and operation of the machine will be readily apparent and that no specific reiteration of the steps involved in producing stereograms or other changeable pictures is necessary. It will be understood that the machine is designed according to various engineering exigencies which render the same operable to produce the finished picture product rapidly, efficiently and inexpensively. While the machine has been described in connection with the production of stereograms or changeable pictures that have been defined as coming under the heading of lineograms and which are made up from four different stereoscopic or other views, obviously the machine may by suitable modification be employed for producing lineograms of a greater or less number of such views. Where four such views are concerned, it is obvious that four pairs of offset printing blanket cylinders and printing plate cylinders will be utilized and arrangement made for their proper coordination with the single platen cylinder. Where, for example, only two such views are concerned, either of the two cooperating frame assemblies 35 and 37 or 36 and 39 may be omitted. Alternatively, one of the cooperative printing elements of each assembly may be omitted and the other remaining printing elements properly coordinated to produce the desired result. In either case, it is obvious that the circumferential extent of the semi-cylindrical lenticulating plate 24, the semi-cylindrical platen plate 16, the semi-cylindrical printing plates 34, and the full cylindrical circumferential extent of the offset blankets 32 will be equal.

Wherein, as in the latter instance, only two stereoscopic or changeable views are employed and are viewed simultaneously or separately as the case may be in the completed lineogram, the two printed series of picture increments will be placed on the picture sheets S in the manner diagrammatically illustrated in Figure 13. In such an instance the grooves $g$ or $g'$ existing between the elevated ridges $r$ or $r'$, as the case may be, of each offset blanket 32 is of a width equal to the width of the printing ridges. The two offset blankets 32 are so initially adjusted and caused to register with each other that those portions of the picture sheets which are printed upon by the ridges $r$ of one blanket, for example, the blanket which is shown in full lines, will not be printed upon by the ridges $r'$ of the other blanket and vice versa. In this manner the condition previously described wherein the entire surface of the picture sheets is printed upon while at the same time the presence of unprinted voids is eliminated, is obtained.

Obviously, where more than two stereoscopic or changeable views are employed, the width of the grooves existing between the elevated ridges of the offset blankets 32 will be made correspondingly wider to accommodate in the printing of the composite picture the printing of the various picture increments in such a manner that adjacent increments will be serially or sequentially arranged with the various series occurring consecutively.

In Figure 10 there is disclosed a modified form of the invention wherein the apparatus is designed to produce stereograms or other forms of lineograms by a color process. The illustration is entirely diagrammatic or schematic and accordingly the heated lenticulating cylinder, the printing platen, the offset blankets and the printing plate rolls have been shown in the form of geometric circles of appropriate circumferences to produce the desired result and have also been designated by reference characters similar to those applied to corresponding parts in the preceding views. In this form of the invention, plural printing plates 34' are utilized in cooperation with each offset grooved printing blanket 32', one for each color desired in the completed composite picture, for applying to their respective blankets ink impressions of a single view corresponding to the colors utilized in the composite picture. Whereas in the previously described form of the invention, the lenticulating, platen and printing surfaces 24', 16' and 34' respectively were of semi-cylindrical design, in the present instance they are shown as being of full cylindrical design. Irrespective, however, of these details of construction, the essential features of the invention are always preserved.

In Figure 11 a schematic representation similar to Figure 10 illustrates a modified form of apparatus, wherein printing and lenticulation are performed simultaneously directly on the lens-forming film sheets. Likewise in this view, reference characters corresponding to those employed in Figures 1 to 9, inclusive, have been employed to designate corresponding parts. In this form of the invention the lenticulating cylinder 24" in addition to its lenticulating function operates as a printing platen in cooperation with a main ungrooved offset printing blanket cylinder 150", which receives a lineated composite impression from the various separation offset blanket cylinders 32" and transfers the same to the film sheets S' passing between the cylinders 24" and 150". The same conditions of registry are maintained between the various printing cylinders and the lenticulating cylinder as in the other forms of the invention whereby proper registry of the individual lens strips and the underlying picture increments are obtained.

In Figure 12, yet another modified form of the invention is schematically disclosed. Utilizing corresponding reference numerals to designate corresponding parts in the previous views, the invention employs a heated lenticulating cylinder 24''' and a lenticulating platen cylinder 252''' which are designed for cooperation with each other in the manner of pinch rolls and which are independent of, i. e., removed from ,the printing instrumentalities 16''', 32''', 34''', etc., and are positioned in advance thereof. The plastic lens forming film sheets S' are fed between these two cylinders and after the lenticulating operation is performed on the upper side of the film sheets S', printing is performed on the underneath side thereof by means of a main ungrooved offset cylinder 150''' similar to the cylinder 150" of Figure 11 which similarly receives and transfers its composite impression to the film sheets S'.

What is claimed is:

1. The method of producing a composite picture suitable for use in the production of stereograms which consists in progressively removing by an offset printing operation a series of equally spaced narrow band-like parallel increments from an ink representation of an individual picture on a printing plate, transferring said removed increments to a picture sheet and placing the same progressively thereon in equally spaced parallel relationship; and progressively removing by an offset printing operation, a similar series of increments from an ink representation of a stereoscopically related picture on a second printing plate, transferring said latter removed increments to the picture sheet and placing the same progressively thereon in register with and in the voids existing on the picture sheet between the first-mentioned placed increments, thus substantially filling said voids.

2. The method of producing a composite picture suitable for use in the production of stereograms which consists in removing by a printing operation a series of equally spaced narrow band-like parallel increments from an ink representation of an individual picture on a printing plate, transferring said removed increments to a picture sheet and placing the same progressively thereon in equally spaced parallel relationship; and removing by a printing operation a similar series of increments from an ink representation of a stereoscopically related picture on a second printing plate, transferring said latter removed increments to the picture sheet and placing the same thereon in register with and in the voids existing on the picture sheet between the first-mentioned placed increments, thus substantially filling said voids.

3. The method of producing a composite picture suitable for use in the production of stereograms which consists in removing by a printing operation a series of equally spaced narrow band-like parallel increments from an ink representation of an individual picture on a printing plate, transferring said removed increments to a picture sheet and placing the same thereon in equally spaced parallel relationship; removing by a printing operation similar series of increments from ink representations of individual pictures which are stereoscopically related to one another and to the first-mentioned picture on respective printing plates, transferring the increments of said latter series to the picture sheet and placing the same thereon in non-overlapping relationship in the voids existing on the picture sheet between the first-mentioned placed increments.

4. The method of producing a composite picture suitable for use in the production of stereograms which consists in removing by a printing operation a pattern having voids therein from an ink representation of an individual picture on a printing plate, transferring said pattern to a picture sheet; removing by a printing operation a pattern from an ink representation of a stereoscopically related picture on a second printing plate, transferring said second pattern to the picture sheet by placing the same thereon in register with and in the voids existing in said first-mentioned pattern.

5. The method of producing a stereogram which consists in removing by a printing operation a series of equally spaced narrow band-like parallel increments from an ink representation of an individual picture on a printing plate, transferring said removed increments to a picture sheet and placing the same progressively thereon in equally spaced parallel relationship; and removing by a printing operation a similar series of increments from an ink representation of a stereoscopically related picture on a second printing plate, transferring said latter removed increments to the picture sheet and placing the same thereon in register with and in the voids existing on the picture sheet between the first-mentioned placed increments, thus substantially filling said voids; and thereafter progressively superimposing a transparent plastic film over the printed sheet and progressively lenticulating the film sheet while on the printed sheet to provide lenticulations in the film sheet in register with adjacent pairs of printed increments.

6. The method of producing composite picture stereograms which consists in progressively removing by an offset printing operation a series of equally spaced narrow band-like parallel increments from an ink representation of an individual picture on a printing plate, transferring said removed increments to a picture sheet and placing the same progressively thereon in equally spaced parallel relationship; and progressively removing by an offset printing operation a similar series of increments from an ink representation of a stereoscopically related picture on a second printing plate, transferring said latter removed increments to the picture sheet and placing the same progressively thereon in register with and in the voids existing on the picture sheet between the first-mentioned placed increments, thus substantially filling said voids; and thereafter progressively superimposing a transparent lenticulated plastic film over the printed sheet and uniting the same thereto with the lenticulations thereof in register with adjacent picture increments.

7. In an apparatus for producing stereograms and the like, a combined lenticulating platen and printing platen cylinder, a pair of offset cylinders arranged around said first mentioned cylinder in substantial tangential relationship thereto, offset printing blankets covering said offset cylinders and having raised spaced circumferentially disposed printing ribs thereon, the grooves existing between the ribs being at least equal in width to the width of the ribs, means for axially adjusting one of said offset cylinders to cause the grooves thereon to register with the rib on the other blanket, a plate cylinder cooperating with each offset cylinder, a lenticulating cylinder having raised spaced circumferentially disposed lenticulating ribs thereon, said lenticulating cylinder being disposed in substantial tangential relationship to the combined lenticulating platen and printing platen cylinder, and means for adjusting the position of the lenticulating cylinder axially.

8. In an apparatus for producing stereograms and the like, a combined lenticulating platen and printing platen cylinder, a pair of offset cylinders arranged around said first mentioned cylinder in substantial tangential relationship thereto, stretchable resilient offset printing blankets covering said offset cylinders and having raised spaced circumferentially disposed printing ribs thereon, the grooves existing between the ribs normally being equal at least in width to the width of the ribs, means for axially adjusting one of said offset cylinders to cause the grooves thereon to register with the ribs on the other blanket, a plate cylinder cooperating with each offset cylinder, a lenticulating cylinder having raised spaced circumferentially disposed lenticulating ribs thereon, means for heating said lenticulating cylinder, said latter cylinder being disposed in substantial tangential relationship to the combined lenticulating platen and printing platen cylinder, and means for individually stretching said offset printing blankets to collectively vary the distance between the ribs thereon and cause register thereof with the ribs of the lenticulating cylinder.

9. In an apparatus for producing stereograms and the like, a combined lenticulating platen and printing platen cylinder, a plurality of offset cylinders arranged around said first mentioned cylinder in substantial tangential relationship thereto, stretchable resilient offset printing blankets covering said offset cylinders and having raised spaced circumferentially disposed printing ribs thereon, the grooves existing between the ribs normally being equal at least in width to the width of the ribs, means for axially adjusting each of said offset cylinders to cause each of the grooves thereon to register with a rib on each of the other blankets, a plate cylinder cooperating with each offset cylinder, a lenticulating cylinder having raised spaced circumferentially disposed lenticulating ribs thereon, means for heating said lenticulating cylinder, said latter cylinder being disposed in substantial tangential relationship to the combined lenticulating platen and printing platen cylinder, and means for individually stretching said offset printing blankets to collectively vary the distance between the ribs thereon and cause register thereof with the ribs of the lenticulating cylinder.

10. In an apparatus of the character described, a rigid framework, a cradle frame tiltably mounted on the framework, a grooved lenticulating cylinder rotatably mounted in the cradle frame, a combined lenticulating platen and printing platen cylinder mounted in the framework, means for adjusting the position of said cradle to move the lenticulating cylinder toward and away from the platen cylinder, an auxiliary frame pivoted to the framework, a plurality of offset circumferentially grooved printing cylinders rotatably mounted in the auxiliary frame, means for adjusting the position of the auxiliary frame to move the printing cylinders in unison toward and away from the platen cylinder, a second auxiliary frame pivoted to the framework, a plurality of plate cylinders mounted in the second auxiliary frame, means for adjusting the position of said latter frame to move the plate cylinders in unison toward and away from the offset printing cylinders, means for feeding transparent plastic sheets between the lenticulating cylinder and the platen cylinder, means for feeding picture sheets to be printed between the offset printing cylinders and said platen cylinder and thereafter between the lenticulating cylinder and platen cylinder, and an applicator device positioned in the path of movement of the plastic sheets and designed for contact with the latter for applying a solvent or the like to the sheets in advance of the lenticulating and the platen cylinders.

11. In an apparatus of the character described, a rigid framework, a cradle frame tiltably mounted on the framework, a grooved lenticulating cylinder rotatably mounted in the cradle frame, a combined lenticulating platen and printing platen cylinder mounted in the framework, means for adjusting the position of said cradle to move for lenticulating cylinder toward and away from the platen cylinder, an auxiliary frame pivoted to the framework, a plurality of offset circumferentially grooved printing cylinders rotatably mounted in the auxiliary frame, means for adjusting the position of the auxiliary frame to move the printing cylinders in unison toward and away from the platen cylinder, a second auxiliary frame pivoted to the framework, a plurality of plate cylinders mounted in the second auxiliary frame, means for adjusting the position of said latter frame to move the platen cylinders in unison toward and away from the offset printing cylinders, means for feeding transparent plastic sheets between the lenticulating cylinder and the platen cylinder, means for feeding picture sheets to be printed between the offset printing cylinders and said platen cylinder and thereafter between the lenticulating cylinder and platen cylinder, an applicator device positioned in the path of movement of the plastic sheets and designed for contact with the latter for applying a solvent or the like to the sheets in advance of the lenticulating and the platen cylinders, and means for heating the lenticulating cylinder.

12. The method of producing a composite picture suitable for use in the production of lineograms which consists in progressively removing by an offset printing operation a series of equally spaced narrow band-like parallel ink increments from a printing plate having thereon an ink representation of an individual picture, transferring said removed increments to a transparent picture sheet and placing the same progressively thereon in equally spaced parallel relationship; removing by an offset printing operation similar series of increments from other printing plates having thereon ink representations of pictures which are different from one another and from the first-mentioned picture, transferring the increments of said latter series to the picture sheet and placing the same progressively thereon in non-overlapping relationship in the voids existing on the picture sheet between the first-mentioned placed increments; and thereafter progressively forming lenticulations in the transparent picture sheet in register with adjacent groups of said placed increments.

13. In an apparatus for producing stereograms and the like, a combining lenticulating platen and printing platen cylinder, a pair of offset cylinders arranged around said first-mentioned cylinder in substantial tangential relationship thereto, offset printing blankets covering said offset cylinders and having raised spaced circumferentially disposed printing ribs thereon, the grooves existing between the ribs being at least equal in width to the width of the ribs, means for axially adjusting one of said offset cylinders axially to cause the grooves thereon to register with the ribs on the other blanket, a plate cylinder cooperating with each offset cylinder, and a lenticulating cylinder having raised spaced circumferentially disposed lenticulating ribs thereon, said lenticulating cylinder being disposed in substantial tangential relationship to the combined lenticulating platen and printing platen cylinder.

14. In an apparatus for producing stereograms and the like, a combined lenticulating platen and printing platen cylinder, a plurality of offset cylinders arranged around said first-mentioned cylinder in substantially tangential relationship thereto, offset printing blankets covering said offset cylinders and having raised spaced circumferentially disposed printing ribs thereon, the grooves existing between the ribs being at least equal in width to the width of the ribs, means for axially adjusting each of said offset cylinders axially to cause each groove on its respective blanket to register with a rib on each of the other blankets, a plate cylinder cooperating with each offset cylinder, and a lenticulating cylinder having raised spaced circumferentially disposed lenticulating ribs thereon, said lenticulating cylinder being disposed in substantial tangential relationship to the combined lenticulating platen and printing platen cylinder.

15. In an apparatus for producing stereograms and the like, a combined lenticulating platen and printing platen cylinder, a pair of offset cylinders arranged around said first-mentioned cylinder in substantial tangential relationship thereto, offset printing blankets covering said offset cylinders and having raised printing portions thereon, means for axially adjusting one of said offset cylinders axially to cause said raised portions thereon to operatively register with the raised portions on the other blankets, a plate cylinder cooperaitng with each offset cylinder, and a lenticulating cylinder having raised lenticulating ribs thereon, said lenticulating cylinder being disposed in substantial tangential relationship to the combined lenticulating platen and printing platen cylinder.

16. In an apparatus for producing stereograms and the like, a combined lenticulating platen and printing platen cylinder, a plurality of offset cylinders arranged around said first-mentioned cylinder in substantial tangential relationship thereto, offset printing blankets covering said offset cylinders and having raised printing portions thereon, a plate cylinder cooperaitng with each offset cylinder, and a lenticulating cylinder having raised lenticulating ribs thereon, said lenticulating cylinder being disposed in substantial tangential relationship to the combined lenticulating platen and printing platen cylinder.

17. In an apparatus for producing stereograms and the like, a combined lenticulating platen and printing platen cylinder, a pair of offset cylinders arranged around the first mentioned cylinder in substantial tangential relationship thereto, said cylinders having spaced circumferential printing areas thereon separated by non-printing areas, means for axially adjusting one of said cylinders to cause the printing areas thereon to register with the non-printing areas on the other cylinder, a plate cylinder cooperating with each offset cylinder, a lenticulating cylinder having raised spaced circumferentially disposed lenticulating ribs thereon, said lenticulating cylinder being disposed in substantial tangential relationship to the combined lenticulating platen and printing platen cylinder, and means for adjusting the position of the lenticulating cylinder axially.

18. In an apparatus for producing stereograms and the like, a combined lenticulating platen and printing platen cylinder, a plurality of offset cylinders arranged around said first mentioned cylinder in substantially tangential relationship thereto, said cylinders having spaced circumferential printing areas thereon separated by non-printing areas, means for axially adjusting the position of certain of said cylinders to cause the printing areas thereon to register in non-overlapping relationship with the non-printing areas on the other cylinders, a plate cylinder cooperating with each offset cylinder, a lenticulating cylinder having raised spaced circumferentially disposed lenticulating ribs thereon, said lenticulating cylinder being disposed in substantial tangential relationship to the combined lenticulating platen and printing platen cylinder, and means for adjusting the position of the lenticulating cylinder axially.

WILLIAM HENRY van BENSCHOTEN.

CERTIFICATE OF CORRECTION.

Patent No. 2,297,846.                                        October 6, 1942.

WILLIAM HENRY van BENSCHOTEN.

It is hereby certified that error appears in the printed specification of the above numbered patent requiring correction as follows: Page 9, second column, line 68, claim 11, for "for lenticulating" read --the lenticulating--; and that the said Letters Patent should be read with this correction therein that the same may conform to the record of the case in the Patent Office.

Signed and sealed this 16th day of January, A. D. 1945.

Leslie Frazer (Seal)                                        Acting Commissioner of Patents.